United States Patent [19]
Filippi

[11] Patent Number: 5,413,390
[45] Date of Patent: May 9, 1995

[54] VEHICLE SUN ROOF FASTENING DEVICE
[75] Inventor: Aldo Filippi, Torino, Italy
[73] Assignee: Roltra Morse S.p.a., Rivoli, Italy
[21] Appl. No.: 46,030
[22] Filed: Apr. 12, 1993
[30] Foreign Application Priority Data Apr. 14, 1992 [IT] Italy ................. TO92A0337

[51] Int. Cl.⁶ .................. E05C 19/10; B60J 7/00
[52] U.S. Cl. ..................... 292/96; 292/110;
  292/201; 292/DIG. 5; 292/DIG. 49; 296/121
[58] Field of Search .............. 292/96, 110, 111, 115,
  292/132, 201; 296/223, 224, 121

[56] References Cited
U.S. PATENT DOCUMENTS

| 2,161,907 | 6/1939 | Barr et al. ................. 292/96 X |
| 3,216,763 | 11/1965 | Heincelman .................. 296/121 |
| 3,348,876 | 10/1967 | Pollak et al. ................ 296/121 |
| 3,958,822 | 5/1976 | Germer ................... 292/110 X |
| 4,056,276 | 11/1977 | Jarvis .................. 292/DIG. 49 X |
| 4,142,751 | 3/1979 | Varda ................... 292/DIG. 49 X |
| 4,572,572 | 5/1986 | Nakamura et al. ................ 296/223 |
| 4,682,745 | 7/1987 | Acres ................... 292/DIG. 49 X |
| 4,691,949 | 9/1987 | Grantz et al. ........... 292/DIG. 49 X |
| 5,058,939 | 10/1991 | Miilu ................... 292/DIG. 5 X |
| 5,154,479 | 10/1992 | Sautter, Jr. ................. 296/121 |
| 5,284,378 | 2/1994 | Sautter, Jr. ............. 292/DIG. 5 X |

FOREIGN PATENT DOCUMENTS

| 283373 | 3/1967 | Australia .............. 292/DIG. 11 |
| 524460 | 12/1953 | Belgium ................. 292/201 |
| 1580138 | 12/1970 | Germany . |
| 4111646 | 10/1992 | Germany . |

Primary Examiner—Peter M. Cuomo
Assistant Examiner—Suzanne L. Dino
Attorney, Agent, or Firm—Wolf, Greenfield & Sacks

[57] ABSTRACT

A vehicle sun roof fastening device, particularly for convertible vehicles, wherein a lever is fitted with a hinged latch element designed to mate with a fixed connecting element, and is hinged to a support so as to oscillate in relation to the support and by virtue of a crank mechanism interposed between the lever and the support and operated by a linear actuator, the output rod of which is connected to one end of a crank having the other end angularly integral with a crank (14) on the crank mechanism.

16 Claims, 5 Drawing Sheets

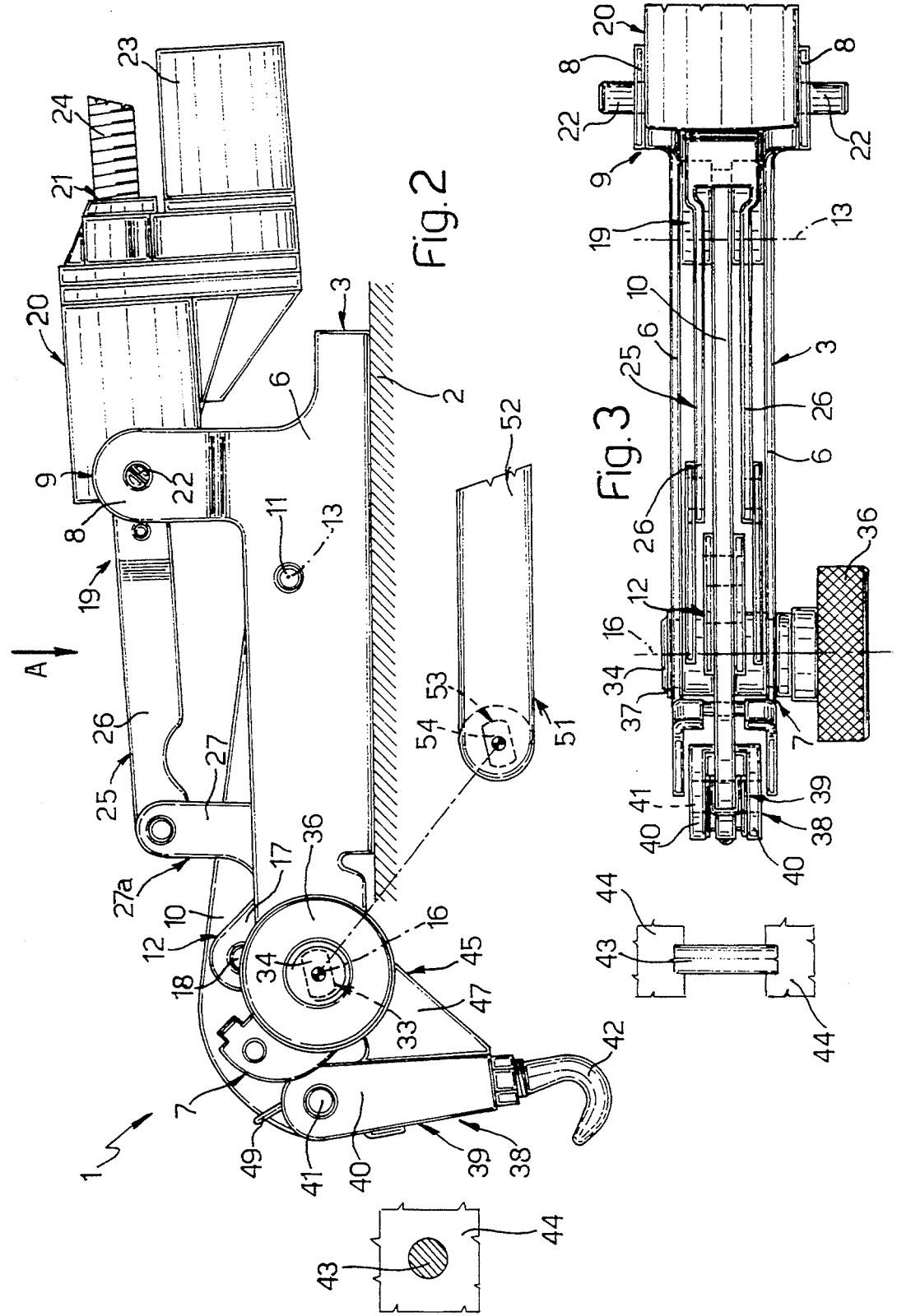

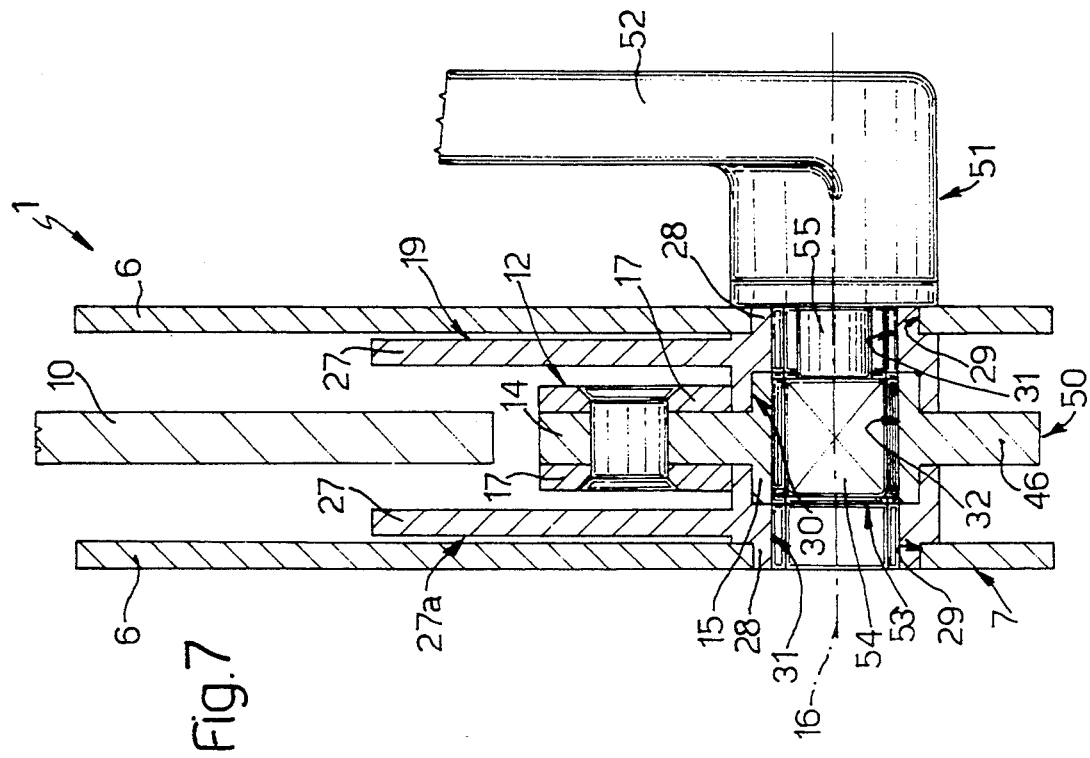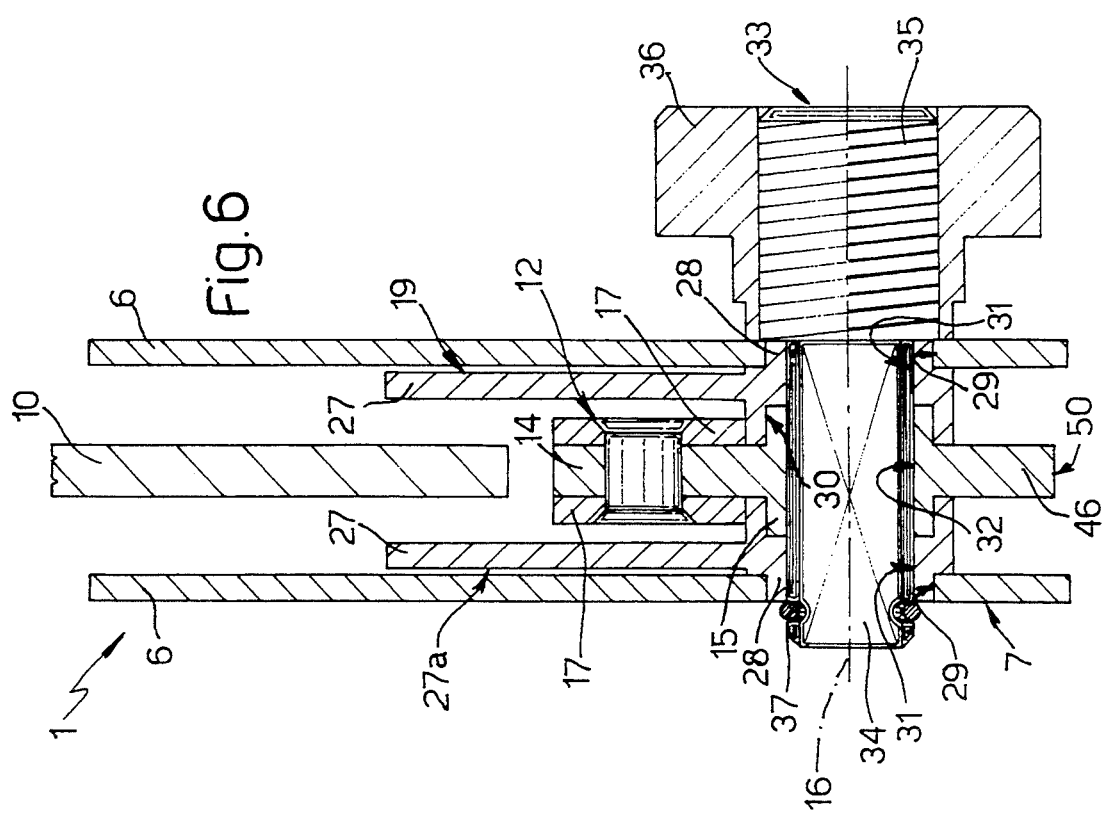

VEHICLE SUN ROOF FASTENING DEVICE

BACKGROUND OF THE INVENTION

The present invention relates to a vehicle sun roof fastening device, particularly for convertible vehicles.

The sun roof on convertible vehicles is fastened using a manually operated device comprising a bracket integral with the front portion of the roof and supporting a lever, which presents a first end hinged to the bracket, and is fitted on the opposite end with a hinged latch element activated by a crank mechanism. The crank mechanism is located between the bracket and the lever, and is operated manually by the user so as to oscillate the lever between an engaged position, wherein the latch element positively engages a fixed connecting element on the vehicle body, and an idle position wherein the latch element is released from the connecting element.

A drawback of known devices of the aforementioned type is the difficulty encountered in connecting the latch element to the fixed connecting element when closing the roof, which involves a good deal of physical effort on the part of the user, and cannot normally be performed when the vehicle is moving.

SUMMARY OF THE INVENTION

It is an object of the present invention to provide a vehicle sun roof fastening device designed to overcome the aforementioned drawback.

According to the present invention, there is provided a vehicle sun roof fastening device, in particular for convertible vehicles, the device comprising a supporting bracket fitted integral with the sun roof; a lever hinged to and oscillating in relation to the bracket about a first axis; a latch element hinged to the lever; means for activating the lever and comprising a first crank hinged to the bracket so as to oscillate about a second axis; and means for controlling said activating means, for moving said latch element between a forward engaged position, wherein the latch element positively engages a fixed connecting element on the vehicle, and a withdrawn released position; characterized by the fact that said control means comprise a powered rod moving reciprocatingly in relation to said bracket and in a direction perpendicular to the first axis; a second crank connected to said rod so as to rotate about said second axis; and pin means extending along said second axis and connected to both the cranks and said bracket.

According to a preferred embodiment of the above fastening device, said pin means are selectable from two different removable connecting pins selectively connectable to said cranks; a first said connecting pin being a first key connected to both said cranks for rendering them angularly integral with each other and with the first connecting pin itself; and a second said connecting pin consisting of a second key angularly integral with the first crank and connected in rotary manner to the second crank.

BRIEF DESCRIPTION OF THE DRAWINGS

A non-limiting embodiment of the present invention will be described by way of example with reference to the accompanying drawings, in which:

FIG. 2 shows a side view of the FIG. 1 device;

FIG. 3 shows a partial view according to arrow A in FIG. 2;

FIG. 6 shows a larger-scale section along line VI—VI in FIG. 4;

FIG. 7 shows the same view as in FIG. 6, of a variation of a detail on the FIG. 6 device.

DETAILED DESCRIPTION OF THE INVENTION

Figure 1:
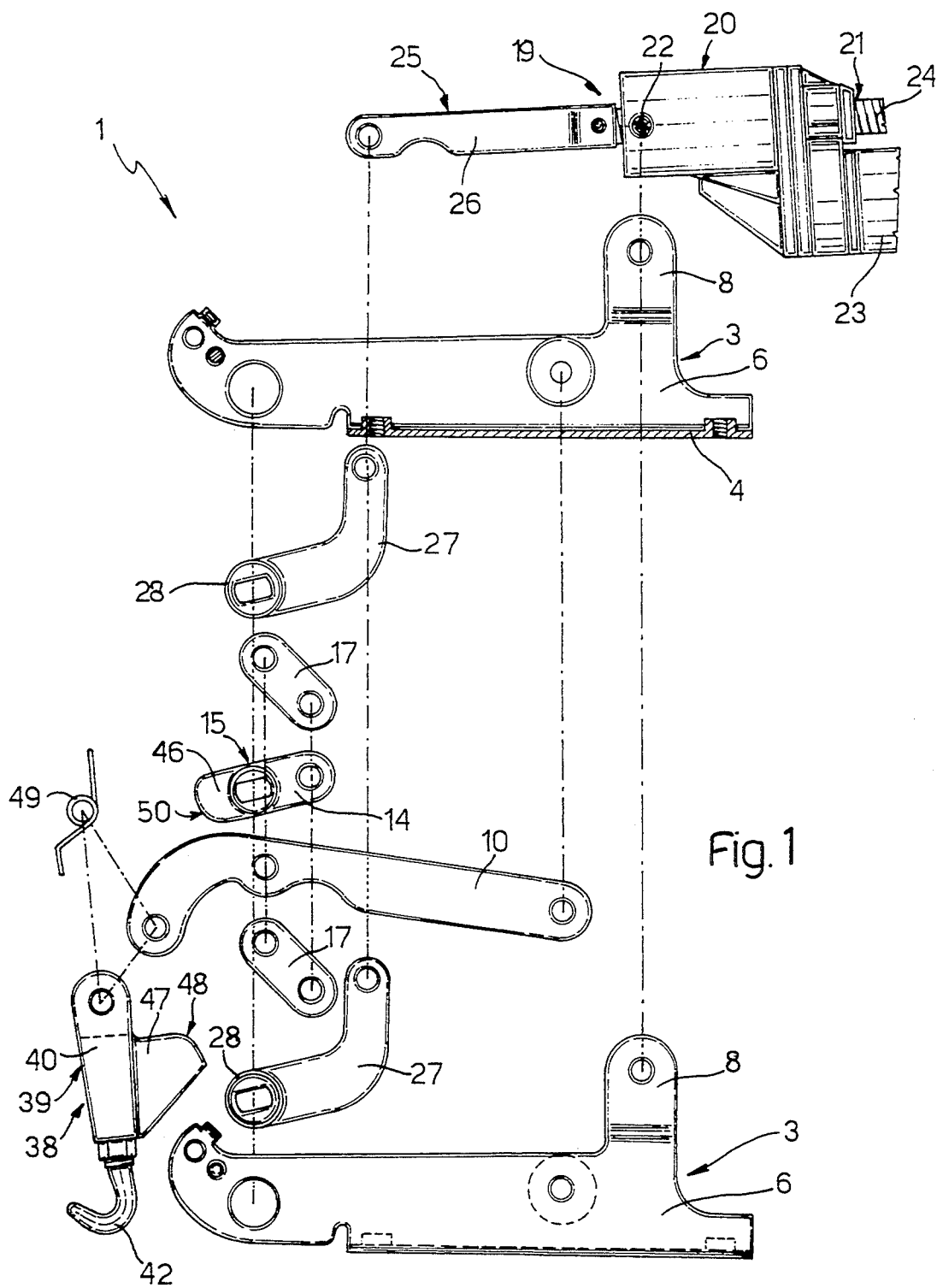
FIG. 1 shows an exploded view, with parts removed for clarity, of a preferred embodiment of the device according to the present invention.

Number 1 in the accompanying drawings indicates a fastening device for the sun roof 2 (shown partially) of a convertible vehicle (not shown). Device 1 comprises a U-shaped supporting bracket 3 in turn comprising a bottom wall 4 fittable in known manner to roof 2, and two lateral walls 6. At one end, walls 6 project beyond the edge of wall 4 so as to define a fork 7, and, at the other, present respective appendixes 8 projecting from walls 6 on the opposite side to wall 4 and defining a second fork 9.

Device 1 also comprises a lever 10 having an end portion located between and hinged to walls 6 by a pin 11 adjacent to fork 9; and a crank mechanism 12 located between lever 10 and bracket 3, for oscillating lever 10 in relation to bracket 3 and about an axis 13 perpendicular to walls 6.

Crank mechanism 12 comprises a crank 14 having a small end 14 hinged to fork 7 so as to oscillate about an axis 16 parallel to axis 13; and a connecting rod 17 having one end hinged to crank 14, and the opposite end hinged by a pin 18 to an intermediate portion of lever 10.

Crank mechanism 12 is activated by a control device 19 comprising an electromechanical linear actuator 20 having a screw-nut screw output coupling 21 and the outer casing of which is hinged to fork 9 by a pair of pins 22 parallel to axes 13 and 16. Actuator 20 comprises a nut screw (not shown) rotated about its axis by an electric motor 23; and a screw 24 connected to the nut screw (not shown) and extending perpendicular to axes 13 and 16. Screw 24 terminates with a fork 25, the arms 26 of which are hinged to a first end of a crank 27a consisting of two arms 27 parallel to each other and extending on either side of crank mechanism 12.

Each arm 27 presents a second end extending between small end 15 of crank 14 and a respective wall 6, and which presents an externally cylindrical hub 28 facing respective wall 6 and engaging in rotary manner a hole 29 formed through wall 6 and coaxial with axis 16, for hinging respective arm 27 to bracket 3. On the opposite side to hubs 28, arms 27 present respective cylindrical bushes coaxial with axis 16 and defining a seat 30 engaged in rotary manner by small end 15. Hubs 28 present respective substantially rectangular-section holes 31 aligned along axis 16 with each other and with a further hole 32 formed through small end 15 of crank 14 and of the same size and cross section as holes 31.

Crank 27a is made angularly integral with crank 14 via a key 33 comprising a portion 34 having a cross section complementary to that of holes 31 and 32 and which engages holes 31 and 32 in axially-sliding angularly-fixed manner. Key 33 also comprises a further externally-threaded portion 35 supporting a knob 36, projecting entirely outwards of a respective wall 6, and blending with portion 34 via a cylindrical shoulder which is maintained contacting the outer surface of wall 6 by a retaining ring 37 fitted on to the end portion of portion 34 projecting outwards of the other wall 6.

Finally, device 1 comprises a latch element 38 in turn comprising a fork 39, the arms 40 of which are hinged to the free end of lever 10 by a pin 41 parallel to axes 13 and 16; and a hook 42 integral with a crosspiece on fork 39 and having its concavity facing a mating pin element 43 integral with vehicle body 44 and facing the front edge of roof 2 in the closed position.

Element 38 is rotated about the axis of pin 41 by a cam system 45 comprising a cam 46 integral with small end 15 of crank 14; and a tappet element 47 defined by a substantially triangular plate integral with fork 39 and having a substantially S-shaped edge 48 on the side facing cam 46. System 45 also comprises a spring 49, preferably a double pin spring, interposed between lever 10 and fork 39 for holding edge 48 of tappet element 47 permanently contacting edge 50 of cam 46.

Figure 4:
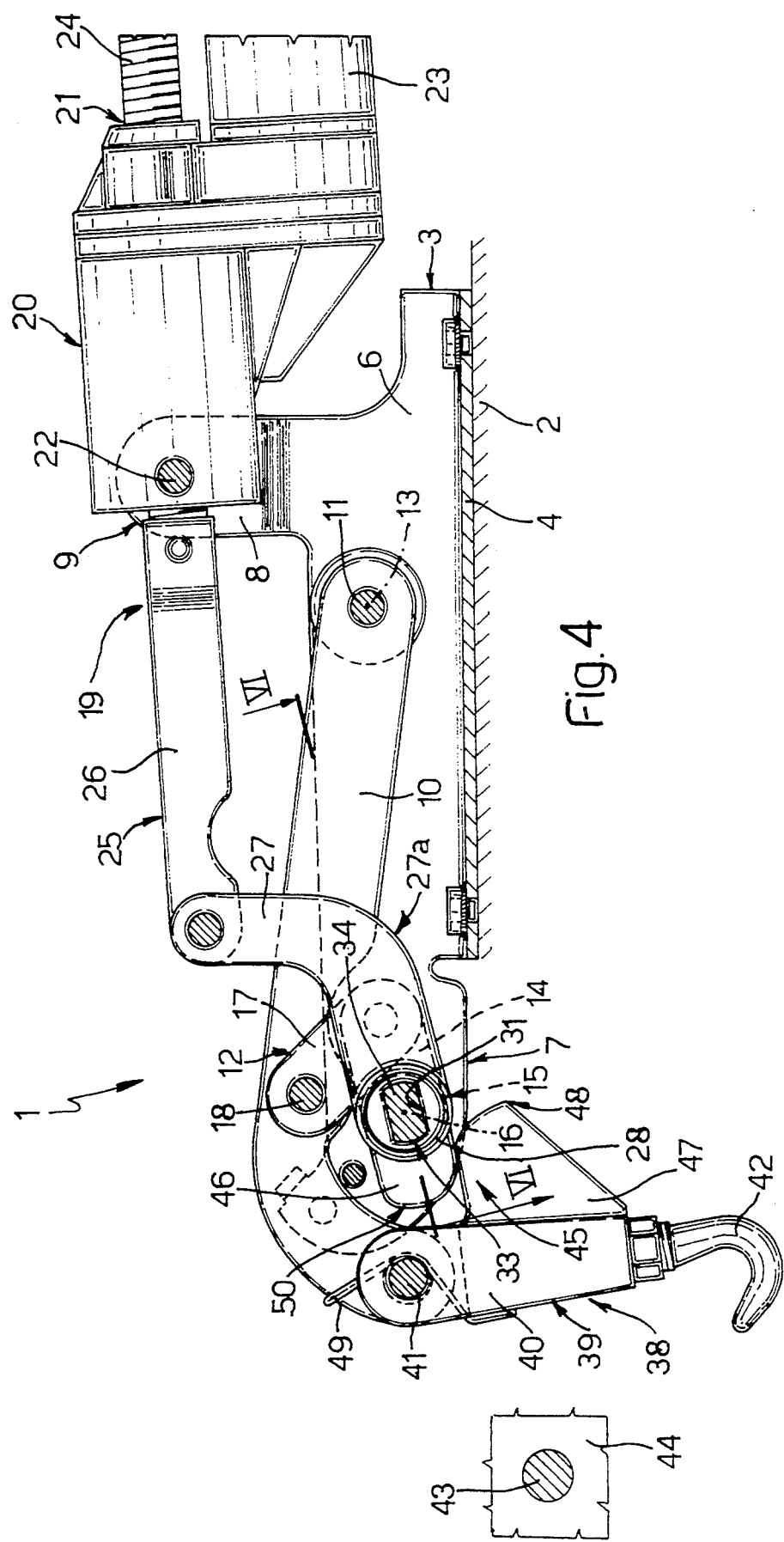
FIGS. 4 and 5 show respective sections of the FIG. 2 device in two different operating positions.
Figure 5:
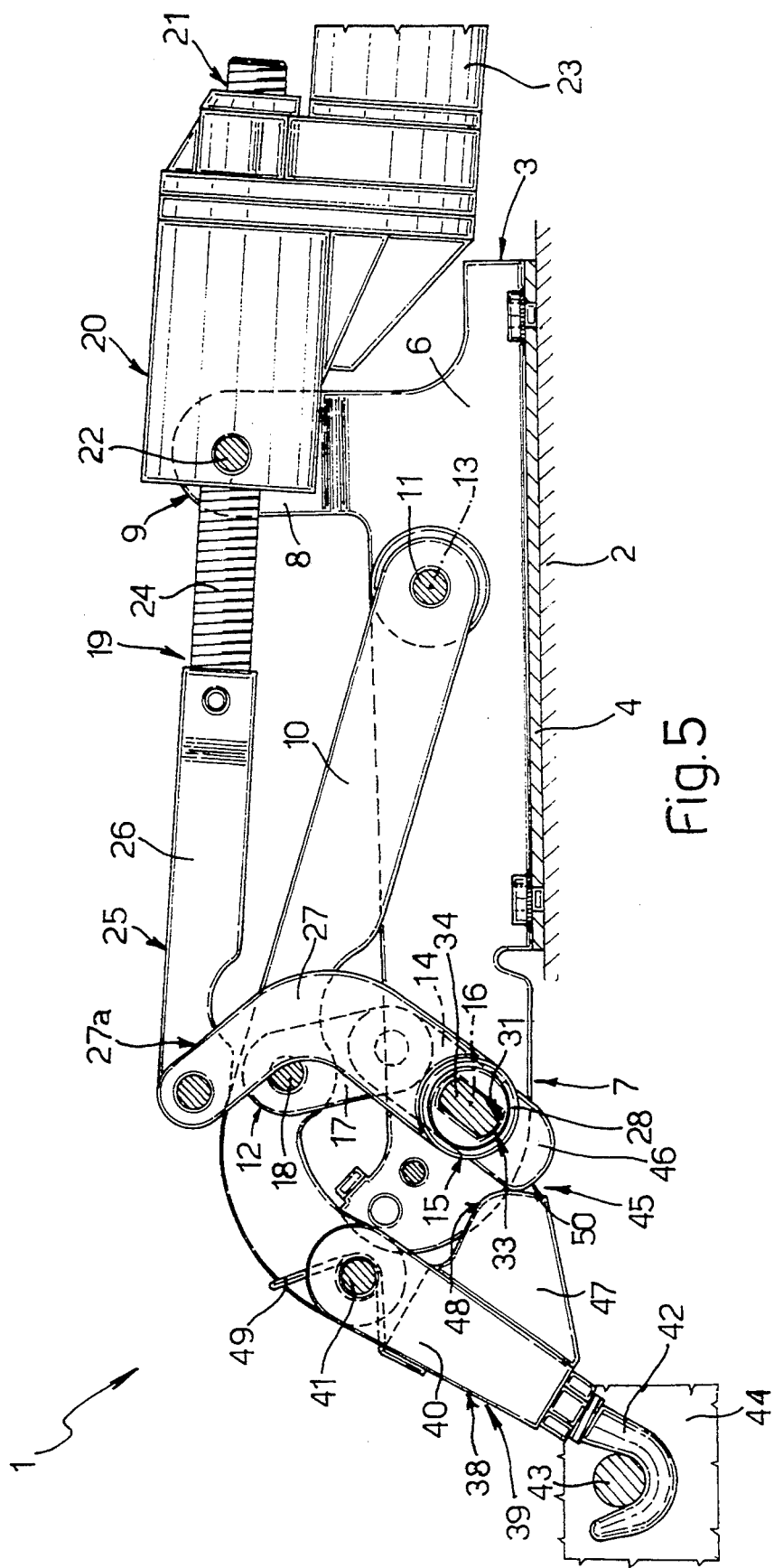

Operation of device 1 will now be described as of the FIG. 4 condition, wherein roof 2 is in the closed position, latch element 38 is withdrawn and disengaged from mating element 43, and crank 14 and arms 27 are secured angularly to one another by key 33. As of the above condition, operation of electric motor 23 displaces screw 24 so as to rotate arms 27 anticlockwise in FIG. 4, and so rotate crank 14 clockwise about axis 13, and move lever 10 and, consequently, latch element 38 from the withdrawn position to a forward operating position (FIG. 5) wherein hook 42 positively engages element 43. As element 38 moves from the withdrawn to the forward operating position, cam 46 rotates about axis 16, and tappet element 47 rotates element 38 about pin 41 and in relation to lever 10, so as to position hook 42 beneath mating element 43.

At this point, further anticlockwise rotation (in FIG. 5) of crank 27a by actuator 20 results in further clockwise rotation of lever 10 about axis 13, so as to move hook 42 towards bracket 3 and so perfectly close roof 2.

As shown in FIG. 7, in the event of failure of electric motor 23, so that roof 2 cannot be fastened automatically, device 1 may also be operated manually by simply removing key 33, by torquing knob 36 on threaded portion 35 of key 33 so as to extract ring 37 from its seat, and replacing it with a control device 51 comprising a handle 52 with a key 53.

Again with reference to FIG. 7, key 53 comprises an end portion 54 connected to handle 52 by a cylindrical pin 55 engaging in rotary manner a respective hole 31. Portion 54 engages hole 32 on small end 15 of crank 14, and presents the same cross section as portion 34 of pin 33, and a length approximately equal to but no longer than hole 32 measured along axis 16, so as to enable operation of crank 14 alone, when pin 53 is torqued manually.

I claim:

1. A device for fastening a vehicle sun roof comprising:
   a supporting bracket integral with the sun roof;
   a lever hinged to and movable relative to the bracket about a first axis;
   a latch element hinged to the lever;
   means for activating the lever including a first crank hinged to the bracket to move relative to the bracket about a second axis;
   means for controlling the activating means for moving the latch element between a forward engaged first position, wherein the latch element positively engages a fixed connecting element on the vehicle, and a withdrawn released second position, the control means including a powered rod moving reciprocatingly relative to the bracket and in a direction perpendicular to the first axis;
   a second crank connected to the rod to rotate about the second axis; and
   pin means extending along the second axis and connected to the first and second cranks and to the bracket.

2. The device of claim 1, wherein the pin means includes a key connected to both the first and second cranks for rendering them angularly integral with each other.

3. The device of claim 1, further comprising:
   a cam element; and
   a tappet element on the latch element, the tappet element cooperating with the cam element for rotating the latch element relative to the lever and about a third axis substantially parallel to the first axis.

4. The device of claim 3, wherein the cam element rotates about the second axis and is integral with the first crank, and wherein elastic reaction means are provided for maintaining the tappet element in contact with the cam element.

5. The device of claim 3, wherein the tappet element has an S-shaped surface along which the cam element moves.

6. The device of claim 3, wherein the cam element is coupled to the second crank, wherein the pin means extends through the cam element.

7. The device of claim 1, wherein the pin means includes a connecting pin having a key angularly integral with the first crank and connected in rotary manner to the second crank.

8. The device of claim 1, wherein the pin means is selectable from two different removable connecting pins, a first connecting pin having a first key connected to both the first and second cranks for rendering them angularly integral with each other and with the first key itself, and a second connecting pin having a second key integral with the first crank and connected for rotational motion with respect to the second crank.

9. A device for fastening a vehicle sun roof comprising:
   a supporting bracket integral with the sun roof;
   a lever hinged to and movable relative to the bracket about a first axis, the lever being in a first position when the sun roof is fastened, and a second position when the sun roof is unfastened;
   a crank mechanism including a first crank hinged to move the lever relative to the bracket about the first axis and about a second axis;
   a second crank for rotatable movement about the second axis;
   a rod coupled to the second crank;
   a motor for moving the rod in a direction perpendicular to the first axis so that the movement of the motor causes the second crank to rotate about the second axis causing the crank mechanism to move the lever; and
   a pin extending along the second axis and connecting the first and second cranks and the bracket.

10. The device of claim 9, wherein the pin includes a key for rendering the first and second cranks angularly integral with each other.

11. The device of claim 9, further comprising:
    a latch element coupled to the lever;

a cam element coupled to the crank mechanism; and a tappet element on the latch element, the tappet element cooperating with the cam element for rotating the latch element relative to the lever and about a third axis substantially parallel to the first axis.

12. The device of claim 11, further comprising elastic reaction means for maintaining the tappet element in contact with the cam element.

13. The device of claim 11, wherein the tappet element has an S-shaped surface along which the cam element moves.

14. The device of claim 11, wherein the pin extends through the cam element.

15. The device of claim 9, wherein the pin includes a connecting pin having a key angularly integral with the first crank and connected in rotary manner to the second crank.

16. The device of claim 9, wherein the pin is selectable from two different removable connecting pins selectively connectable to said cranks, the first pin being connected to both the first and second cranks for rendering them angularly integral with each other and with the first connecting pin, and a second connecting pin angularly integral with the first crank and connected for rotational motion with respect to the second crank.

* * * * *